US012400780B2

(12) United States Patent
Nogués Barrieras et al.

(10) Patent No.: US 12,400,780 B2
(45) Date of Patent: *Aug. 26, 2025

(54) NON-LIQUID IMMERSED TRANSFORMER

(71) Applicant: Hitachi Energy Ltd, Zürich (CH)

(72) Inventors: Antonio Nogués Barrieras, Saragossa (ES); Rafael Murillo, Saragossa (ES); Carlos Roy Martín, Saragossa (ES); Lorena Cebrián Lles, Saragossa (ES)

(73) Assignee: Hitachi Energy Ltd, Zürich (CH)

( * ) Notice: Subject to any disclaimer, the term of this patent is extended or adjusted under 35 U.S.C. 154(b) by 785 days.

This patent is subject to a terminal disclaimer.

(21) Appl. No.: 17/634,591

(22) PCT Filed: Aug. 13, 2020

(86) PCT No.: PCT/EP2020/072700

§ 371 (c)(1),
(2) Date: Feb. 11, 2022

(87) PCT Pub. No.: WO2021/028515

PCT Pub. Date: Feb. 18, 2021

(65) Prior Publication Data

US 2022/0336137 A1 Oct. 20, 2022

(30) Foreign Application Priority Data

Aug. 14, 2019 (EP) .................................... 19382712

(51) Int. Cl.
*H01F 27/08* (2006.01)
*H01F 27/16* (2006.01)
(Continued)

(52) U.S. Cl.
CPC ............. *H01F 27/16* (2013.01); *H01F 27/24* (2013.01); *H01F 27/32* (2013.01)

(58) Field of Classification Search
CPC ........ H01F 27/16; H01F 27/105; H01F 27/12; H01F 27/125; H01F 27/24; H01F 27/32; H01F 27/10; H01F 27/306
See application file for complete search history.

(56) References Cited

U.S. PATENT DOCUMENTS 5,097,241 A * 3/1992 Smith ................. H01F 27/2876
336/60
5,682,292 A * 10/1997 Salanki ............... H01F 27/2876
336/62
(Continued)

FOREIGN PATENT DOCUMENTS

CN 103597559 A 2/2014
DE 1763830 A1 12/1971
(Continued)

OTHER PUBLICATIONS

International Search Report and Written Opinion of the International Searching Authority, PCT/EP2020/072700, mailed Nov. 4, 2020, 12 pages.
(Continued)

*Primary Examiner* — Mang Tin Bik Lian
*Assistant Examiner* — Mangtin Lian
(74) *Attorney, Agent, or Firm* — Sage Patent Group

(57) ABSTRACT

A non-liquid immersed transformer includes a magnetic core and a coil winding forming a plurality of winding turns around the magnetic core; a cooling system and a first conductive connector. The cooling system includes a cooling pipe for the flow of a cooling fluid, the cooling pipe extending along the coil winding and including a first point adjacent to a turn of the coil winding, and a second point adjacent to another turn of the coil winding. The conductive
(Continued)

connector is arranged at one of the first and second points, to electrically connect an inner side of the cooling pipe with a turn of the coil winding.

20 Claims, 2 Drawing Sheets

(51) Int. Cl.
*H01F 27/24* (2006.01)
*H01F 27/32* (2006.01)

(56) References Cited

U.S. PATENT DOCUMENTS

2005/0243502 A1* 11/2005 Griesinger .............. H01F 27/10 165/138
2008/0295998 A1 12/2008 Aiello et al.
2009/0066453 A1* 3/2009 Koivuluoma ....... H01F 27/2876 336/60
2010/0156583 A1* 6/2010 Solar ..................... H01F 38/085 336/62
2012/0262264 A1* 10/2012 Engelage .............. H01F 27/306 336/55
2012/0268227 A1* 10/2012 Howes ................ F28D 15/0266 336/57
2015/0123756 A1* 5/2015 Hyde .................. H01F 27/2876 336/55

FOREIGN PATENT DOCUMENTS

EP 3373314 * 9/2008
EP 3373314 A1 * 9/2018 ............. H01F 27/10
KR 101743629 B1 6/2017
WO 2012103613 A1 8/2012

OTHER PUBLICATIONS

Extended European Search Report dated Feb. 13, 2020 for European Patent Application No. 19382812.8, 5 pages.
Notice of Allowance mailed Jun. 2, 2025 for Chinese Patent Application No. 202080051760.9, 6 pages (English translation provided).

* cited by examiner

NON-LIQUID IMMERSED TRANSFORMER

CROSS REFERENCE TO RELATED APPLICATIONS

This application is a 35 U.S.C. § 371 national stage application of PCT International Application No. PCT/EP2020/072700 filed on Aug. 13, 2020, which in turn claims foreign priority to European Patent Application No. 19382712.8, filed on Aug. 14, 2019, the disclosures and content of which are incorporated by reference herein in their entirety.

The present disclosure relates to transformers, more specifically to non-liquid immersed transformers comprising a fluid cooling system.

BACKGROUND

In order to cool down the transformer some systems use a gas, e.g. air, to refrigerate the winding or coils thereof. Such air cooling may be forced or natural. In case of forced-air cooling, the blowing equipment e.g. a fan, may be positioned to blow the airflow to the windings. However, the cooling capacity of such airflow may not be enough to dissipate the heat.

It is also known to refrigerate non-liquid immersed transformers using hydrocoolers that consists on passing forced-air through pipes having a cold fluid, e.g. water, circulating therein in order to refrigerate the airflow and then directing this cold airflow to the coils of the transformer to improve its cooling capacity. This solution presents several drawbacks, such as using an enclosure thereby increasing the footprint and the cost of the transformer.

An alternative consists on using hollow conductors or metallic pipes e.g. made of copper or aluminium, as conductive turns of the windings of the transformer and also for circulating of a cooling fluid. The use of those metallic pipes involve several drawbacks: such hollow conductor pipes may require an extra space in order to accommodate the conduit, i.e. to permit enough cooling fluid flow, and thus, the size i.e. the footprint, not only of the coil winding but also of the whole transformer is substantially increased. In addition, such special winding pipes are difficult to manufacture and expensive. Furthermore, the relatively large size of these hollow conductors creates a considerable increase of additional losses in the conductors due to eddy currents.

Another alternative is the use of cooling pipes around or inside the transformer coil windings having dielectric fluids such as oil, natural esters or synthetics esters fluids circulating therein. K3 fluids may also be used, i.e. dielectric fluids having a flash point higher than 300° C., but they are flammable fluids. Furthermore, some dielectric fluids may be environmentally hazardous in case of leakage or fire break out.

On the other hand, using non-dielectric fluids involves other drawbacks or technical difficulties, due to the electric fields present within the transformer and the risk of discharges or other electrical phenomena.

In conclusion, it would be desirable to provide an environmentally friendly cooling solution for a non-liquid immersed transformer, with a high cooling capacity and which is safe in operation, reduces the risk of failure and/or malfunctioning of the transformer while at the same time is cost effective.

SUMMARY

A non-liquid immersed transformer is provided. The transformer comprises a magnetic core and a coil winding forming a plurality of winding turns around the magnetic core, a cooling system and a first conductive connector. The cooling system comprises a cooling pipe for the flow of a cooling fluid, the cooling pipe extending along the coil winding, and wherein the cooling pipe comprises a first point adjacent to a turn of the coil winding, and a second point adjacent to another turn of the coil winding. The first conductive connector is arranged at one of the first and second points, to electrically connect an inner side of the cooling pipe with a turn of the coil winding.

The conductive connector that electrically connects the inner side of the cooling pipe to a coil winding allows equalising the voltage of the cooling fluid circulating inside the cooling pipe and the voltage of the turn of the coil winding to which it is connected. As the cooling fluid will in contact with the inner side of the cooling pipe, it will therefore be electrically connected to the coil winding. That is, at the first or second points, the voltage of the cooling fluid will be the same as the voltage of the coil winding turn to which it is electrically connected and similar to the voltage of the surrounding turns, so the voltage difference in these areas will be negligible.

This enables the cooling system to work with non-dielectric cooling fluids, such as water, because even a conductive fluid is used the conductive connector may therefore substantially prevent generation of large electric fields, e.g. of more than 1 kV/mm, that may lead to dielectric problems, such partial discharges inside the transformer or direct flashovers. Partial discharges may seriously affect the functioning of the transformer and may also damage the insulation leading to a premature dielectric ageing of the insulation which will lead to a failure. Direct flashovers could occur if the insulation is no longer able to withstand the large electric field.

In addition, the absence of large voltage difference along the cooling pipe prevents electrical currents to occur in the cooling fluid and thus avoiding several problems such as heating of the cooling fluid, electrolysis, ions and/or gasses generation.

Consequently, the cooling system may use water, e.g. distilled and/or deionized water, as cooling fluid which leads to a cost effective, environmentally friendly solution using a non-flammable cooling fluid or coolant thereby preventing the risk of fire breaking out leading to a secure transformer in operation.

In an example, the first point of the cooling pipe may be adjacent to an end of the coil winding and the second point may be adjacent to the other end of the coil winding thereby equalising the voltage of the cooling fluid circulating inside the cooling pipe and the voltage of an end of the winding, i.e. a portion of the winding encompassing the first or last turn of the coil winding.

In an example, the transformer may further comprise a second conductive connector so that the first conductive connector may be arranged at the first point and the second conductive connector may be arranged at the second point.

By using two conductive connectors being arranged at two turns of the winding, enables equalizing the voltage of the cooling fluid to the voltage of each connected turn of the winding which reduces the risk of generating large electric fields in these areas of the winding coils.

The use of a second conductive connector may depend on the electrical configuration of the transformer, for instance in case an end of the coil is grounded e.g. in a three-phase transformer with star connection and the neutral point is grounded, a single conductive connector e.g. arranged at either first or second points, may suffice. In transformers in star connection wherein the neutral point is not grounded or in delta-connection transformers, two conductive connectors may be used.

In an example, the cooling fluid may be water that is environmentally friendly and not flammable fluid, i.e. avoiding fire break out.

In an example, the cooling pipe may further comprise a plurality of convolutions to extend substantially the path of the cooling fluid between one end of the winding i.e. substantially in correspondence with or adjacent to the first or last coil winding turn, and one of the feeding main pipe and the return main pipe.

By using a plurality of convolutions, the path of the cooling fluid may be increased, i.e. the length travelled by the cooling fluid before reaching the beginning of the winding and/or after leaving the end of the is extended. The path may for example be determined as the circuit completed by the fluid between the heat exchanger and the beginning and/or the end of the winding. As the path length grows the electrical resistivity of the cooling fluid is also increased which reduces the electric current that may be generated in the cooling fluid.

The combination of at least a first conductive connector and a cooling pipe comprising a plurality of convolutions enhances the performance of the transformer. In cases comprising a first and a second conductive connector together with the use of a plurality of convolutions also improves the functioning of the transformer.

In an example, the transformer may be a high voltage transformer i.e. generating voltages from 0.4 kV up to 72 kV and power ratings from 50 kVA up to 100 MVA.

BRIEF DESCRIPTION OF THE DRAWINGS

Particular embodiments of the present device will be described in the following by way of non-limiting examples, with reference to the appended drawings, in which.

DETAILED DESCRIPTION

Figure 1:
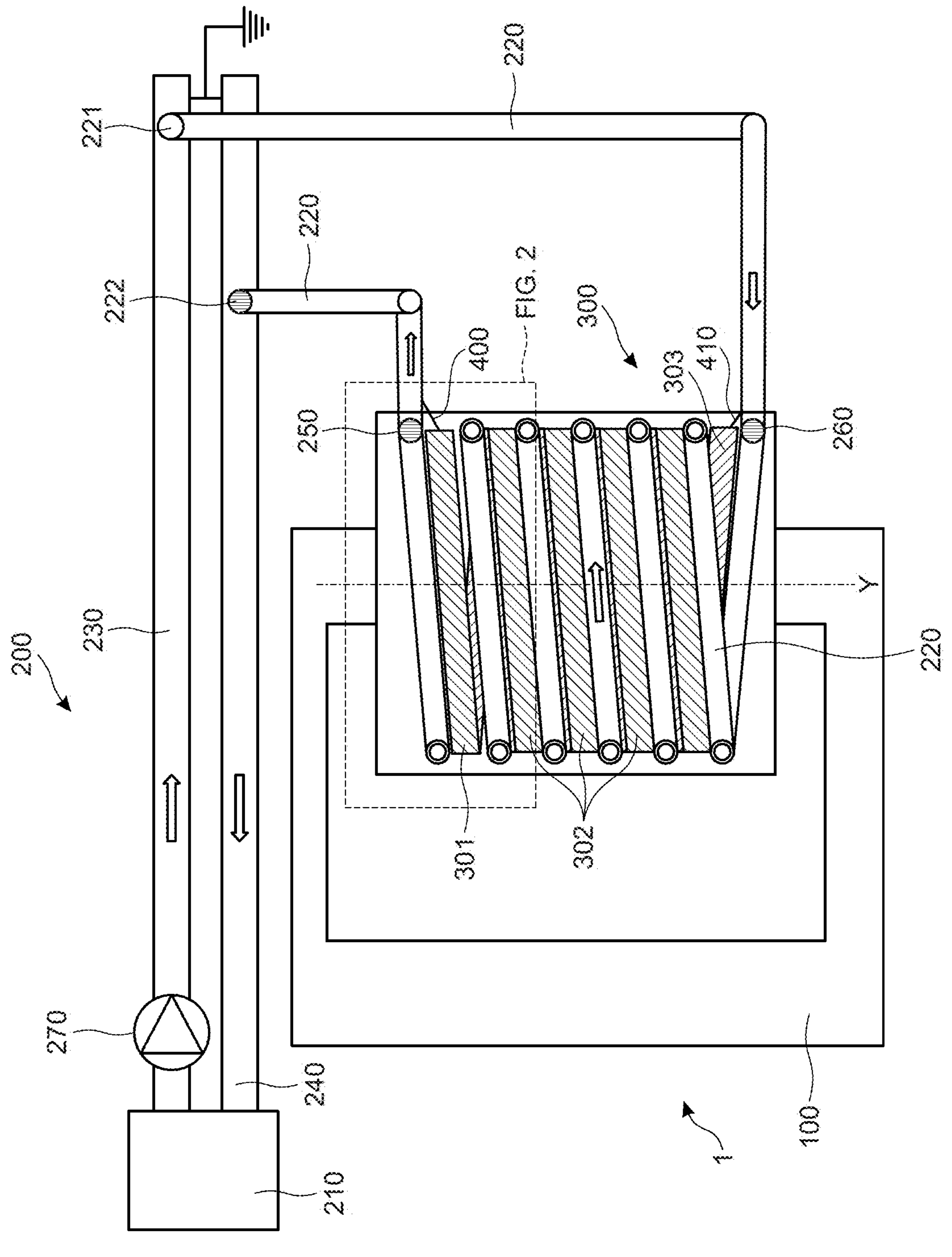
FIG. 1 illustrates a schematic and simplified cross-section of a transformer comprising a magnetic core and a cooling system according to an example.

FIG. 1 depicts a non-liquid immersed or dry-type transformer 1 comprising a magnetic core 100 and at least a coil winding 300 around axis Y, and a cooling system 200.

The coil winding 300 may form a plurality of turns (shown in striped lines) around the magnetic core 100: a first turn 301, i.e. the beginning of winding; a plurality of intermediate turns 302 and a last turn 303, i.e. the termination of the winding. The coil winding 300 may therefore comprise two ends, i.e. portions of the winding encompassing the first turn and the last turns of the coil winding, respectively.

The coil winding 300 may be made of conductive materials e.g. copper or aluminium, that may be covered or coated with an insulating dielectric material such as polyester or epoxy resin, except in the ends in which part of the winding may need to be accessed e.g. to connect a cable to output the generated voltage.

Despite a single-phase magnetic core is depicted in FIG. 1, the transformer 1, in an example, may be a three-phase magnetic core comprising three columns, each column comprising at least a coil winding according to any of the disclosed examples. In such an example, the windings of the transformer may be connected in delta, zigzag or star connection.

The coil winding 300 may have a coil covering or covering made of insulating material such as epoxy to protect the active part of the transformer i.e. the winding turns. The covering may also comprise a plurality of input/output connections e.g. for cooling pipes, for voltage bushes to output the generated voltage, etc.

FIG. 1 also shows the cooling system 200 that may comprise a heat exchanger 210 to which a feeding main pipe 230 for inputting cold water into the windings of the transformer, and a return main pipe 240 for outputting the heated water from the windings of the transformer. In an example, feeding and return main pipes 230, 240 may be made of metallic material and/or may be grounded.

The cooling system 200 may also comprise a cooling pipe 220 which may be made of dielectric material and which may be coupled at its both ends to the feeding main pipe 230 and the return main pipe 240 at coupling points 221, 222 respectively. The cooling pipe 220 may extend along the coil winding 300 and may form loops around axis Y thereby reducing the footprint i.e. the volume occupied by the cooling pipe. By "extend along the coil winding" it is meant that the cooling pipe 220 (or its loops) may be arranged alternatively between adjacent or subsequent winding turns, surrounding the coil winding, in the central empty space of the inner side of the coil winding or any combination thereof e.g. partly surrounding the coil and partly arranged between adjacent winding turns. By having the cooling pipe 220 extending along the coil winding, cooling capacity of the cooling system is improved as the generated heat at the windings may be more efficiently dissipated due to the increased effectiveness of the heat transfer solution.

The cooling pipe 220 may comprise a first point 250 adjacent to a turn of the coil winding and second point 260 adjacent to another turn of the coil winding.

In an example (see FIG. 1), the first point 250 may be adjacent to an end of the coil winding i.e. to the first turn, and the second point 260 may be adjacent to the other end i.e. to the last turn of the coil winding. In another example (not shown), the first point 250 may be adjacent to a second turn of the coil winding and the second point 260 may be adjacent to the penultimate turn of the winding.

A cooling circuit for the flow of a cooling fluid may therefore be formed i.e. the cooled cooling fluid may flow from the heat exchanger to the feeding main pipe and to the cooling pipe which (at least partially) extends along the coil winding, and finally to the return main pipe which directs the fluid back to the heat exchanger.

The cooling pipe 220 may be made of insulating material e.g. plastic, and in order to adapt to each case restrictions e.g. desired connections, specific distances or lengths, etc.; i.e. in order to increase the adaptability of the cooling system, the cooling pipe 220 may comprise different portions or pipes joined together, e.g. screwed, adhere or by any other suitable method; so as to form the whole cooling pipe 220.

The cooling system 200 may also comprise a pump 270 to force a cooling fluid throughout the entire cooling circuit, that is, to flow from the output of the heat exchanger thought the entire cooling circuit and back to the input of the heat exchanger. In an example, the flow of the cooling fluid may be clockwise (see the arrows in FIG. 1) or anti-clockwise, i.e. the first point 250 may be downstream with respect to the second point 260, or vice versa.

Figure 2:
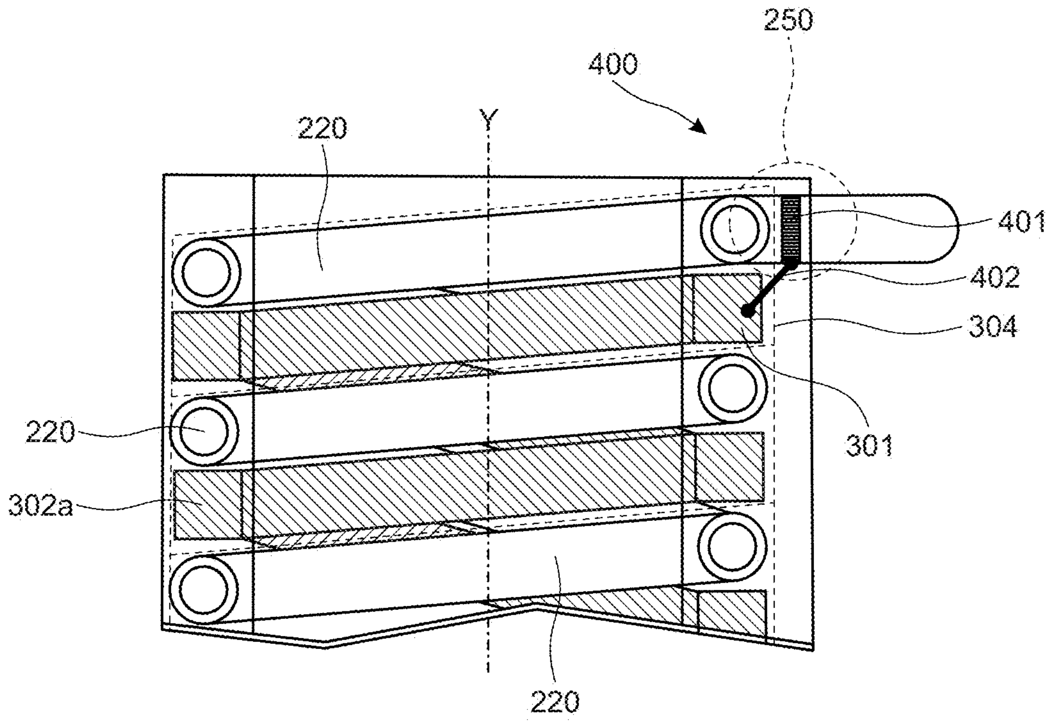
FIG. 2 illustrates a schematic enlarged view of part of the transformer of FIG. 1.

FIG. 2 shows an enlarged portion (see dashed lined area) of the transformer 1 of the example of FIG. 1. The figure shows the first and second coil winding turns 301, 302*a*; a portion of the cooling pipe 220 arranged alternatively between subsequent turns of the coil winding and a conductive connector 400 arranged at the first point 250.

The conductive connector 400 may comprise a metallic piece 401 e.g. a plate, a ring, or any other suitable shaped element, to be arranged on or coupled to the cooling pipe; and a conductive element 402, e.g. a metallic cable, to electrically connect at least the side of metallic piece 401 to be in contact with the cooling fluid, e.g. the inner side, and a turn of the coil winding. In the example of FIG. 2 the conductive element connects the metallic piece and the first turn of the coil winding. In an example, the metallic piece 401 may be made of stain less steel.

The metallic piece 401 may be any metallic pipe. In an example, the metallic piece 401 may be a bushing coupled between two different sections of the cooling pipe. In other example, the metallic piece 401 may be a ring inserted inside the cooling pipe. In an example, the metallic piece 401 may be a plate arranged on the inner side of the cooling pipe e.g. adhered or coupled to the inner wall. Therefore, the side of the cooling pipe 220 to be in contact with the cooling fluid i.e. the inner side, may be regarded as electrically connected to a turn the coil winding.

In an example (see FIG. 1), the transformer 1 may comprise a second conductive connector 410 according to any of the disclosed examples arranged at the second point 260. The use of the second conductive connector may be particularly suitable e.g. depending on the electrical connection of the transformer windings in three-phase transformers. That is, e.g. when the ends of the windings are not grounded, i.e. delta, zigzag or star connection with neutral point not grounded.

In an example, the cooling fluid to be introduced into the cooling pipe 220 may be water. In an example, the cooling fluid may be distilled and/or deionised water which may additionally comprise freezing agents and/or additives e.g. to prevent corrosion of the cooling pipe and increase the temperature range of usage. In an example, the cooling fluid may be any fluid, e.g. water, having an electric conductivity below $5 \cdot 10^{-4}$ S/m which substantially mitigates the generation of electric current flow in the cooling fluid, thus avoiding several problems such as heating of the cooling, electrolysis, ions and/or generation of gasses.

In an example, the cooling pipe 220 may further comprise a plurality of convolutions (e.g., following the winding turns of the coil winding 300) to extend the path of the cooling fluid between one end of the winding and one of the feeding main pipe and the return main pipe. By extending the path, i.e. the length travelled by the cooling fluid before reaching the beginning of the winding and/or after leaving the termination of the winding, increases the resistivity of the cooling fluid thereby preventing the generation of a large electrical current in the cooling fluid and the problems related to it.

Figure 3:
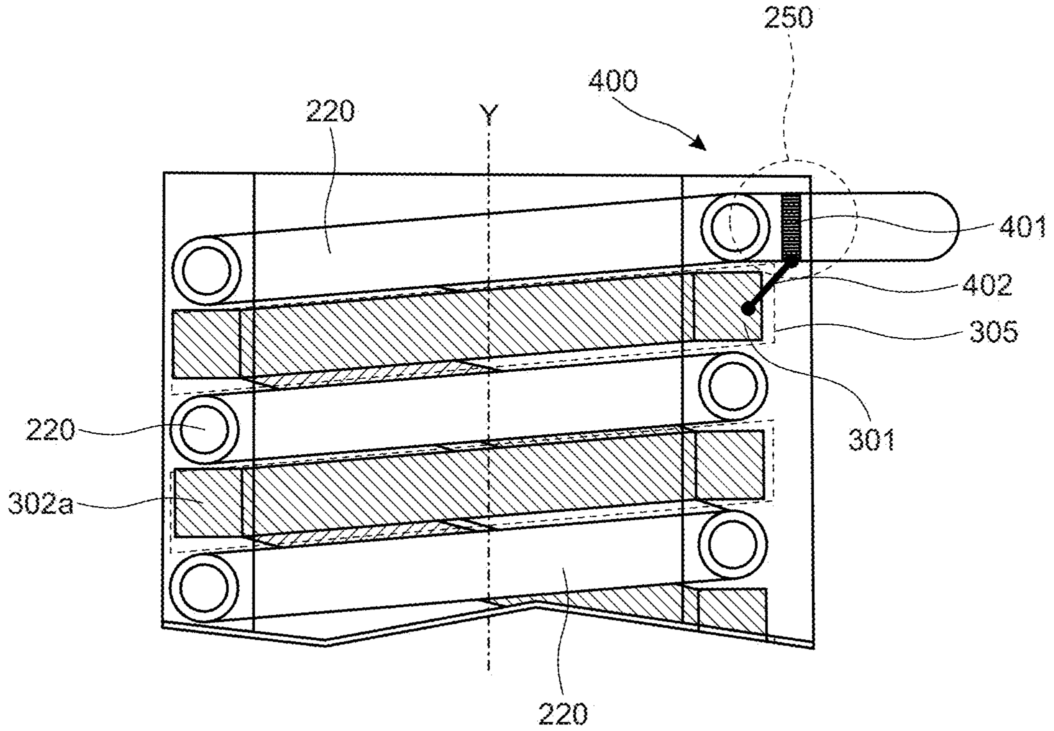
FIG. 3 illustrates a schematic enlarged view of part of the transformer of FIG. 1, according to an alternate embodiment.

In an example, the convolutions may extend the path of the cooling fluid between each end of the winding and the feeding main pipe and the return main pipe, respectively. In examples wherein the coil winding is housed within a covering, the convolutions may be arranged inside or outside the covering. For example, in the embodiment of FIG. 2, the convolutions of the cooling pipe 220 are arranged inside the covering 303, and in the alternative embodiment of FIG. 3, the convolutions of the cooling pipe 220 are arranged outside the covering 304.

In an example, the convolutions may comprise at least one of spiral or serpentine.

The combination of both "serpentine" and at least a first conductive connector may improve the functioning of the transformer as in addition to the prevention of dielectric problems related to high voltage differences in close points or related to the flow of electric current inside the cooling fluid.

Although only a number of particular embodiments and examples have been disclosed herein, it will be understood by those skilled in the art that other alternative embodiments and/or uses of the disclosed innovation and obvious modifications and equivalents thereof are possible. Furthermore, the present disclosure covers all possible combinations of the particular embodiments described. The scope of the present disclosure should not be limited by particular embodiments, but should be determined only by a fair reading of the claims that follow.

The invention claimed is:

1. A non-liquid immersed transformer comprising:

a magnetic core and a coil winding forming a plurality of winding turns around the magnetic core;

a cooling system comprising a cooling pipe for a flow of a cooling fluid, the cooling pipe extending along the coil winding, the cooling pipe comprising a first point adjacent to a turn of the coil winding, and a second point adjacent to another turn of the coil winding; and a first conductive connector arranged at one of the first and second points, to electrically connect an inner side of the cooling pipe with a turn of the coil winding.

2. The transformer according to claim 1, wherein the first point of the cooling pipe is adjacent to an end of the coil winding and the second point is adjacent to the other end of the coil winding.

3. The transformer according to claim 1, further comprising a second conductive connector so that the first conductive connector is arranged at the first point and the second conductive connector is arranged at the second point.

4. The transformer according to claim 1, wherein the first conductive connector comprises a metallic cable and a metallic piece, the metallic cable and the metallic piece being in electrical contact with inner side of the cooling pipe.

5. The transformer according to claim 1, wherein the cooling pipe is made of insulating material.

6. The transformer according to claim 1, wherein the cooling fluid is water.

7. The transformer according to claim 1, wherein the cooling system further comprises:

a heat exchanger; and a feeding and a return main pipes coupled to the heat exchanger, and wherein the feeding main pipe is connected to an input point of the cooling pipe and the return main pipe is connected to an output point of the cooling pipe.

8. The transformer according to claim 7, the feeding and return main pipes are grounded.

9. The transformer according to claim 1, wherein the cooling pipe further comprises a plurality of convolutions to extend the path of the cooling fluid between one end of the winding and one of the feeding main pipe and the return main pipe.

10. The transformer according to claim 9, wherein the plurality of convolutions is arranged inside a coil covering in which the winding turns are housed.

11. The transformer according to claim 9, wherein the plurality of convolutions is arranged outside a coil covering in which the winding turns are housed.

12. The transformer according to claim 1, wherein the transformer is a high voltage transformer.

13. A cooling system for a non-liquid immersed transformer, the cooling system comprising:

a cooling pipe for a flow of a cooling fluid, the cooling pipe extending along a coil winding of the transformer, the coil winding forming a plurality of winding turns around a magnetic core of the transformer, the cooling pipe comprising a first point adjacent to a turn of the coil winding, and a second point adjacent to another turn of the coil winding; and a first conductive connector arranged at one of the first and second points, to electrically connect an inner side of the cooling pipe with a turn of the coil winding.

14. The cooling system according to claim 13, wherein the first point of the cooling pipe is adjacent to an end of the coil winding and the second point is adjacent to the other end of the coil winding.

15. The cooling system according to claim 13, further comprising a second conductive connector so that the first conductive connector is arranged at the first point and the second conductive connector is arranged at the second point.

16. The cooling system according to claim 13, wherein the conductive connector comprises a metallic cable and a metallic piece, the metallic cable and the metallic piece being in electrical contact with inner side of the cooling pipe.

17. The cooling system according to claim 13, wherein the cooling pipe is made of insulating material.

18. The cooling system according to claim 13, wherein the cooling fluid is water.

19. A cooling system for a non-liquid immersed transformer, the cooling system comprising:

a cooling pipe for a flow of a cooling fluid, the cooling pipe extending along a coil winding of the transformer, the coil winding forming a plurality of winding turns around a magnetic core of the transformer, the cooling pipe comprising a first point adjacent to a turn of the coil winding, and a second point adjacent to another turn of the coil winding;

a first conductive connector arranged at one of the first and second points, to electrically connect an inner side of the cooling pipe with a turn of the coil winding;

a heat exchanger; and a feeding main pipe and a return main pipe coupled to the heat exchanger, the feeding main pipe connected to the input point of the cooling pipe and the return main pipe connected to the output point of the cooling pipe.

20. The cooling system according to claim 19, wherein the first point of the cooling pipe is adjacent to an end of the coil winding and the second point is adjacent to the other end of the coil winding.

* * * * *